United States Patent
Okada et al.

(10) Patent No.: US 7,124,025 B2
(45) Date of Patent: Oct. 17, 2006

(54) VEHICULAR NAVIGATION DEVICE

(75) Inventors: Koudai Okada, Kariya (JP); Toshio Fukui, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/357,016

(22) Filed: Feb. 21, 2006

(65) Prior Publication Data

US 2006/0212219 A1    Sep. 21, 2006

(30) Foreign Application Priority Data

Mar. 16, 2005    (JP) .............................. 2005-075040

(51) Int. Cl.
*G01C 21/30* (2006.01)
(52) U.S. Cl. ...................... 701/211; 701/207; 701/208; 701/209; 340/995.23
(58) Field of Classification Search ................ 701/207, 701/202, 200, 208, 209, 210, 211, 212, 213; 340/988, 990–995.23
See application file for complete search history.

(56) References Cited

U.S. PATENT DOCUMENTS 6,343,869 B1 *  2/2002  Kobayashi ................... 362/37
6,366,851 B1 *  4/2002  Chojnacki et al. ........... 701/208
6,370,475 B1 *  4/2002  Breed et al. .................. 701/301
6,466,867 B1 * 10/2002  Sakashita ..................... 701/211
6,804,604 B1 * 10/2004  Yamazaki ..................... 701/211

FOREIGN PATENT DOCUMENTS

| JP | A-8-110236 | 4/1996 |
| JP | A-11-325933 | 11/1999 |

* cited by examiner

Primary Examiner—Richard M. Camby
(74) Attorney, Agent, or Firm—Posz Law Group, PLC

(57) ABSTRACT

A vehicular navigation device includes a control circuit to designate a route to a destination from a start point to be defined. When a route designation instruction is inputted, it is determined whether an intersection being a target for route designation is present close to the current position. When the intersection being the target is present, it is determined whether a lane the vehicle is traveling is a traffic directed lane that includes a traffic direction. When the traveled lane is determined to be the traffic directed lane, a start point is defined as an exit of the intersection reached by following the traffic direction. When the traveled lane is determined to be not the traffic directed lane or when the intersection for the target is determined to be not present, the start point is defined as the current position.

6 Claims, 3 Drawing Sheets

VEHICULAR NAVIGATION DEVICE

CROSS REFERENCE TO RELATED APPLICATIONS

This application is based on and incorporates herein by reference Japanese Patent Application No. 2005-75040 filed on Mar. 16, 2005.

FIELD OF THE INVENTION

The present invention relates to a vehicular navigation device to improve a start node defining process in designating a route.

BACKGROUND OF THE INVENTION

A navigation device in Patent Document 1 designates, as a route, traveling straight at an intersection located just in front of a relevant vehicle having the navigation device. With traveling straight designated as a route, the relevant vehicle may travel a right-turn directed lane, instead of a straight-travel directed lane. At this moment, the driver may be confused by feeling difficulty in changing lanes from the right-turn directed lane to the straight-travel directed lane.

Patent Document 1: JP-H1-325933 A

SUMMARY OF THE INVENTION

It is an object of the present invention to provide a navigation device in a vehicle to solve the above problem. The device designates a route based on a travel lane in proximity to an intersection with a route designation instruction inputted, thereby helping prevent a driver from being suddenly forced to change lanes.

To achieve the above object, a navigation device in a vehicle is provided with the following: a map data storage unit is included for storing map data including information of a traffic direction of a lane; a position detector is included for detecting a current position of the vehicle; an input unit for inputting an instruction of route designation; a route designation unit is included for executing route designation including computation of a route to a destination to designate the route based on a start point; and a navigation unit is included for navigating along a route designated by the route designation unit. Here, the route designation unit includes (i) an intersection determining unit for determining, when the vehicle travels a lane, when the instruction is inputted via the input unit, whether an intersection being a target for route designation is present close to the current position, (ii) a lane determining unit for determining, when the intersection for the target is determined to be present, whether the traveled lane is a traffic directed lane that includes a traffic direction, and (iii) a start point defining unit for defining, when the traveled lane is determined to be the traffic directed lane, the start point as an exit of the intersection reached by following the traffic direction included in the traffic directed lane.

Under the above structure, when route designation is required while traveling a lane having a traffic direction (e.g., right-turn, straight-travel, or left-turn) close to an intersection, the start point used for designating a route is defined as an exit of the intersection following the traffic direction. This allows a driver to observe the traffic direction of the traveled lane to pass through the intersection without being forced to change lanes.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
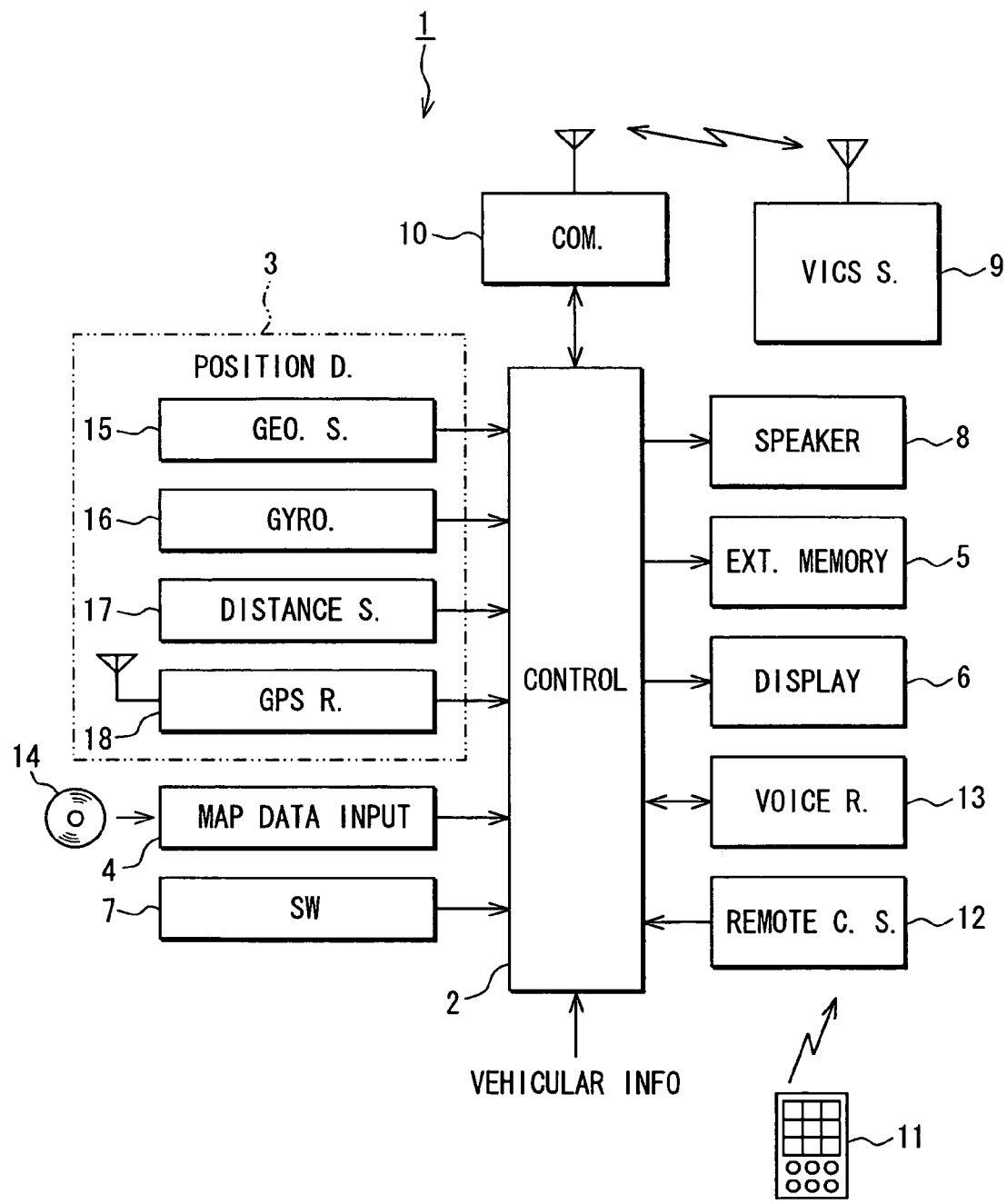
FIG. 1 is a block diagram of an overall structure of a navigation device according to an embodiment of the present invention.

An embodiment of the present invention will be explained with reference to FIGS. 1 to 4. As shown in FIG. 1, a navigation device 1 in a vehicle includes a control circuit 2 for controlling navigation, a position detector 3, a map data input unit 4, an external memory 5, a display device 6, a manipulation switch group 7, a speaker 8, a transmitting/receiving communicator 10 for communicating with an infrastructural station such as a Vehicle Information and Communication System (VICS) station, a remote control sensor 12 for detecting signals from a remote controller 11, and a voice recognition unit 13.

The control circuit 2 is a micro-computer including a CPU, ROM, RAM, I/O interface, and bus connecting the foregoing components (none shown). The ROM stores a program for vehicular navigation; the RAM temporarily stores processing data during executing the program, or map data from the map data input unit 4.

The position detector 3 includes a geomagnetic sensor 15 for detecting an absolute bearing, a gyroscope 16 for detecting a yaw angle speed (or yaw rate), a distance sensor 17 for detecting a travel distance of the vehicle, and a GPS receiver 18 for receiving signals from GPS satellites. These sensors or the like 15 to 18 have individually different types of detection errors, thereby amending each other to detect a highly accurate position. All the sensors or the like 15 to 18 need not be included depending on required detection accuracy. A combination of a rotation sensor of a steering wheel and a wheel sensor for wheel's rotation may be included in the position detector 3.

The map data input unit 4 is for reading data from a map data storage unit of a high-capacity storage media 14 such as a CD-ROM or DVD-ROM. The storage media 14 includes map data (for map display, map matching, or navigation) and position data for facilities. The map data include data of (i) nodes on roads (including key points and intersections), (ii) road widths, and (iii) lanes having traffic directions (i.e. straight travel, right turn, or left turn). The storage media 14 may be a hard disk, magneto optical disk, or high-capacity memory card.

The external memory 5 includes a flash memory card to call for specific data or to store data such as specific data or a software program (for complying with other types of storage media).

The display device 6 is near a driver's seat and includes a color liquid crystal display for map display. The manipulation switch group 7 used as an input unit consists of a mechanical switch at a periphery of the display device 6 or a touch switch formed on the color crystal display of the display device 6; the group 7 provides the control circuit 2 with manipulated input of data or designation items. The remote controller 11 is also used as an input unit; the remote control sensor 12 receives the manipulated input via the controller 11 and provides it to the control circuit 2. The voice recognition unit 13 is also used as an input unit to recognize a user's voice and provides the control circuit 2 with instructions or information.

The speaker 8 outputs a sound based on sound information from the control circuit 2 or a buzzer sound. The communicator 10 includes a VICS sensor unit or an FM tuner (none shown) to provide the control circuit 2 with information signals (using radio wave beacon or light beacon) received from a VICS station 9 or FM multiple broadcasting; the communicator 10 may include a function to transmit vehicular information to outside as needed.

The control circuit 2 includes functions or units of map matching (as a primary function), route designation, and navigation, and is provided with vehicular information such as vehicle speed information. The map matching function locates a current position on a map. The route designation function defines a start point and end point based on positional data and a destination or passing point inputted via the input unit 7, 11, 13; computes routes from the start point to the end point using the Dijkstra method; and designates a route based on computation results. The navigation function gives guidance or recommended route using voices or displaying based on a guidance route obtained by the route designation function.

The route designation of the control circuit 2 will be explained with reference to the flowchart of FIG. 2. The flowchart starts with input of a route designation instruction including an up-to-destination route retrieval instruction or a route condition change during navigating, via the input unit 7, 11, 13.

At Step S1, it is determined whether an intersection being a target for route designation is present close to (or in proximity to) a current position of the vehicle detected by the position detector 3. A distance from the current position to an intersection in a vehicle's advancing direction is measured; a time period for reaching the intersection is computed using the measured distance and a vehicle speed; and the intersection being a target for route designation is determined to be present close to the current position when the time period is a given value or less. The route designation means designating a route newly, or re-designating a route during navigating for changing a route, a destination, or a route condition.

Figure 3:
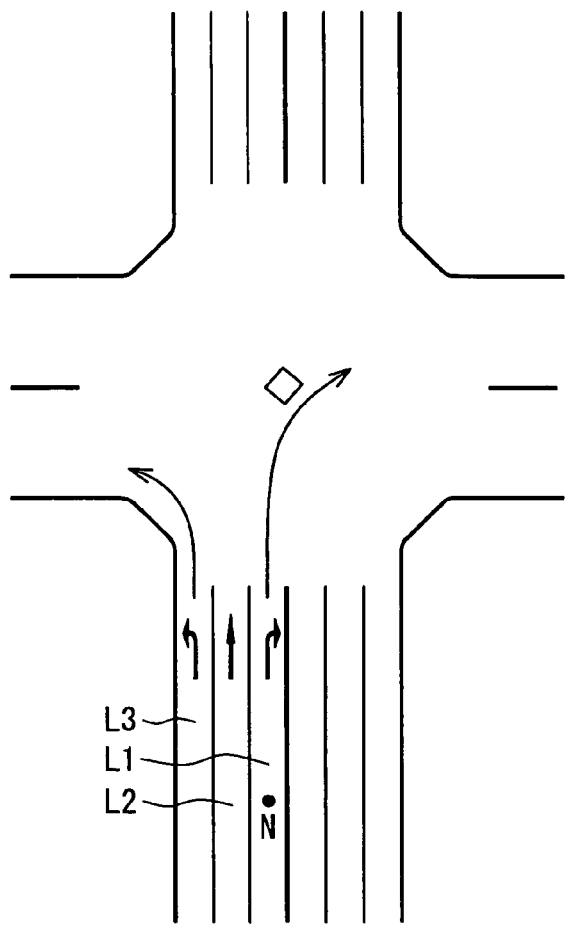
FIG. 3 is a view of an example of an intersection.

When an intersection being a target for route designation is determined to be present close to the current position (Step S1: YES), it is determined whether a lane the vehicle travels is a traffic directed lane that is a lane to have a traffic direction, using lane data in the storage media 14 at Step S2. In FIG. 3, the current position is in N, so the traveled lane is determined to be a right-turn directed lane L1. Even if the traveled lane is a straight-travel directed lane L2 or a left-turn directed lane L3, the vehicle is determined to be traveling a traffic directed lane.

Figure 4:
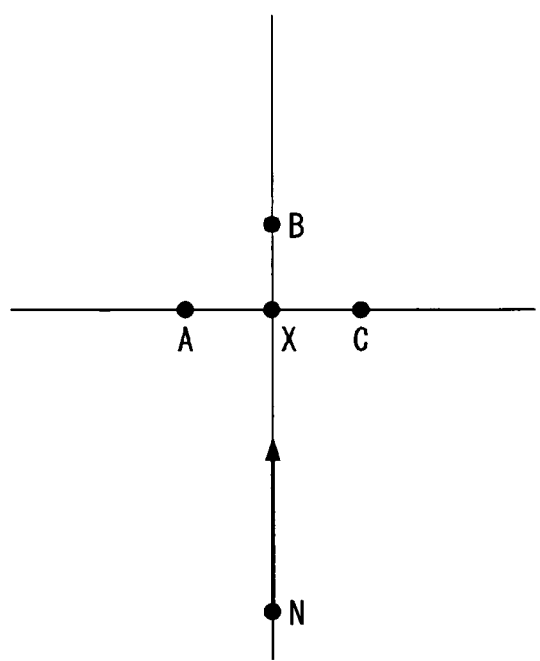
FIG. 4 is a view showing nodes and a position of a relevant vehicle for explaining route designation.

When the determination at Step S2 is affirmed, a start node is defined as a node corresponding to an exit point of the intersection reached by following the traffic direction: since the current position N is in the right-turn directed lane L1, the start node is defined as a node C in FIG. 4 that is the exit point of the intersection following the right turn direction. If the current position N is in the straight-travel directed lane L2, the start node is defined as a node B in FIG. 4 corresponding to the exit point of the intersection following the straight travel direction; in the left-turn directed lane L3, as a node A following the left turn direction.

At Step S4, an end node is defined as a node corresponding to a destination. At Step S5, a route is computed from the start node (C, B, or A) to the end node. At Step S6, the computed route is connected with a route from a node corresponding to the current position N via an intersection node X to the node (C, B, or A), to obtain a combined route. At Step S7, the combined route is designated as a recommended route. At Step S8, navigation along the designated recommended route is performed with information related to the designated route outputted using the display device 6 or speaker 8.

When an intersection being a target for route designation is determined to be not present close to the current position (Step S1: NO), the sequence of the flowchart goes to Step S9. Here, a start node is defined as a node corresponding to the current position N. At Step S10, an end node is defined as a node corresponding to a destination. At Step S11, a route is computed from the start node N to the end node. At Step S12, the computed route is designated as a recommended route.

When the traveled lane is determined to be not a traffic directed lane (at Step S2), the sequence goes to Step S13. Here, it is determined whether a route designation has been executed and thereby the navigation is being executed. When the navigation is determined to be not being executed (Step S13: NO), the sequence goes to Step S9 and then to subsequent Steps S10 to S12.

When the navigation is determined to be being executed (Step S13: YES), the sequence goes to Step S14. Here, a start node is defined as a node corresponding to an exit point of the intersection following the currently designated route. When a right turn is designated in the currently designated route, the start node is defined as a node C in FIG. 4 corresponding to an exit point of the intersection; when a straight travel is designated, as a node B; or when a left turn is designated, as a node A.

At Step S15, an end node is defined as a node corresponding to a destination. At Step S16, a route is computed from the start node C, B, or A to the end node. At Step S17, the computed route is connected with a route from a node corresponding to the current position N via an intersection node X to the node (C, B, or A), to obtain a combined route. At Step S18, the combined route is designated as a recommended route.

Under the above structure of the embodiment, the following takes place: while a relevant vehicle travels a lane, when an instruction of route designation is inputted, it is determined whether an intersection being a target for route designation is present close to a current position of the relevant vehicle; when the intersection being the target is present close to the current position and the traveled lane is a traffic directed lane, a start point is defined as an exit point of the intersection reached by following the corresponding traffic direction; and route designation is then executed based on the defined start point. This allows a driver to observe the traffic direction of the traveled lane to pass through the intersection without being forced to change lanes. After passing through the intersection while maintaining traveling along the traffic direction, the vehicle can be then navigated along a designated route starting from the exit of the intersection without further additional route designation.

Furthermore, when the traveled lane is determined to be not a traffic directed lane, it is determined whether navigation is currently executed or not. When the navigation is not executed, a route is designated by defining the start point as the current position. In contrast, when the navigation is executed, a route is designated by defining the start point as an exit point of the intersection reached by following the designated route. This prevents change of navigation just in front of the intersection, thereby enhancing user-friendliness.

Furthermore, the presence of an intersection being a target for route designation is determined when a time period for reaching the intersection is a given period or less. This allows route designation to be executed smoothly before entering the intersection. Here, a vehicle speed is used for computing the time period for reaching; alternatively, a regulated limiting speed (e.g., stored in the map data) can be used for computing the time period for reaching.

(Modifications)

The present invention may be modified or extended without being limited to the above embodiment. For instance, the presence of an intersection being a target for route designation can be alternatively determined when a distance to the intersection is a given distance or less. Furthermore, a road width may be considered when determining an intersection being a target for route designation. As a road width decreases, a vehicle speed decreases: this may result in possibility that decrease in a road width causes a time period for reaching to increase even if a distance to the intersection is small. In contrast, as a road width increases, a vehicle speed increases: this may result in possibility that increase in a road width causes a time period for reaching to decrease even if a distance to the intersection is large.

Figure 2:
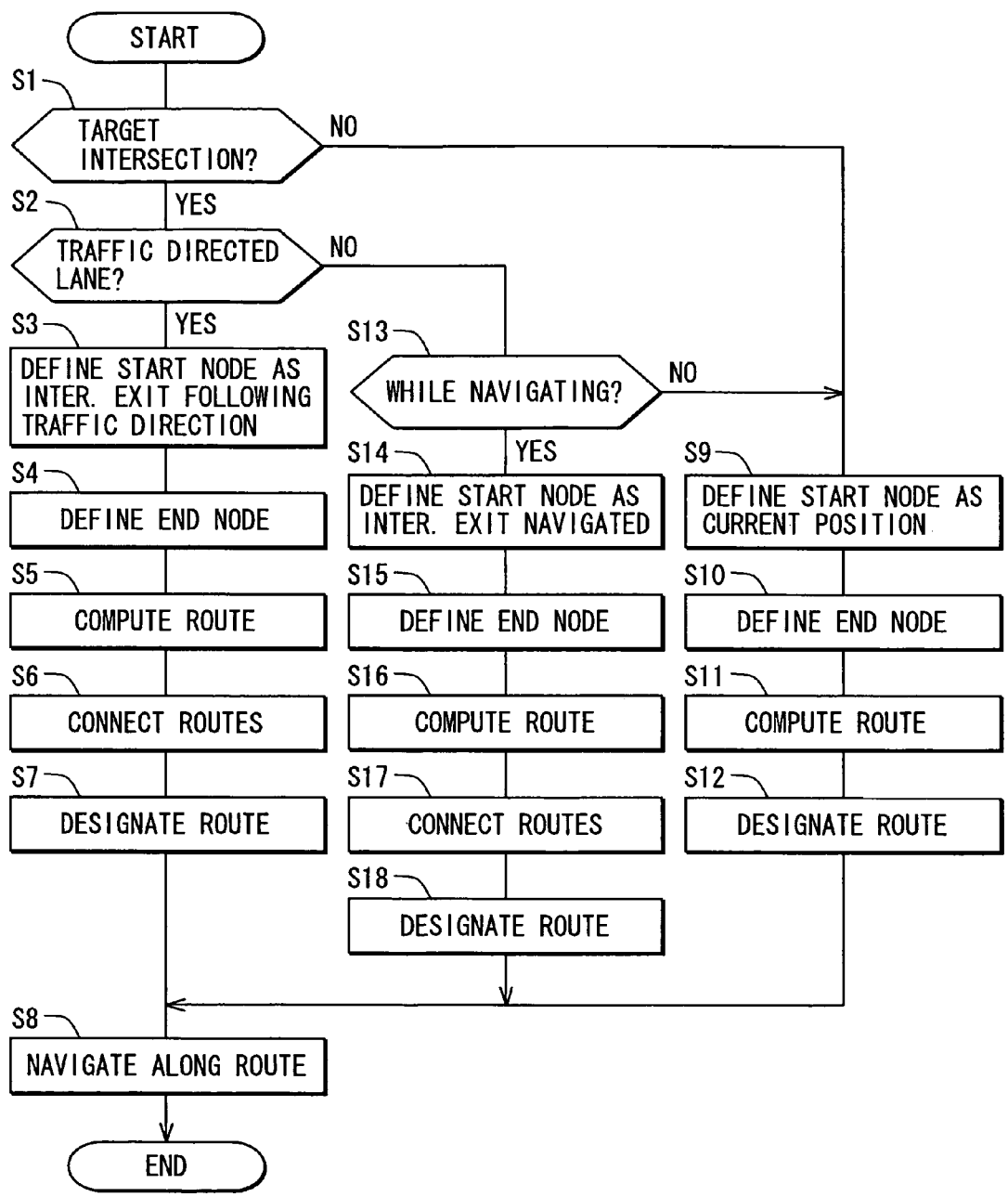
FIG. 2 is a flowchart showing control of a control circuit.

Furthermore, in the flowchart of FIG. 2, Step S13 can be eliminated as a simpler embodiment, and the negative determination at Step S2 causes the sequence of the flowchart to directly advance to Step S9.

The process in the above flowchart may be executed using a CPU, a ROM, and the like. Here, steps in the process may be constructed as means or units in program stored in the ROM or the like.

It will be obvious to those skilled in the art that various changes may be made in the above-described embodiments of the present invention. However, the scope of the present invention should be determined by the following claims.

What is claimed is:

1. A navigation device in a vehicle, the device comprising:
   a map data storage unit for storing map data including information of a traffic direction of a lane;
   a position detector for detecting a current position of the vehicle;
   an input unit for inputting an instruction of route designation; and
   a route designation unit
      for executing route designation including computation of a route to a destination to designate the route based on a start point and
      for including
         an intersection determining unit for determining, when the vehicle travels a lane, when the instruction is inputted via the input unit, whether an intersection being a target for route designation is present close to the current position,
         a lane determining unit for determining, when the intersection for the target is determined to be present, whether the traveled lane is a traffic directed lane that includes a traffic direction, and
         a start point defining unit for defining, when the traveled lane is determined to be the traffic directed lane, the start point as an exit of the intersection reached by following the traffic direction included in the traffic directed lane; and
   a navigation unit for navigating along a route designated by the route designation unit.

2. The navigation device of claim 1, wherein
   when the traveled lane is determined to be not the traffic directed lane or when the intersection for the target is determined to be not present, the start point defining unit defines the start point as the current position.

3. The navigation device of claim 2, wherein
   when the traveled lane is determined to be not the traffic directed lane,
   (i) when the navigation unit does not navigate along a route, the start point defining unit defines the start point as the current position, and
   (ii) when the navigation unit navigates along a route, the start point defining unit defines the start point as an exit of the intersection reached by following the route along which the navigation unit navigates.

4. The navigation device of claim 2, further comprising:
   a navigation determining unit for determining, when the traveled lane is determined to be not the traffic directed lane, whether the navigation unit navigates along a route, wherein
   (i) when the navigating unit is determined to not navigate, the start point defining unit defines the start point as the current position, and
   (ii) when the navigating unit is determined to navigate, the start point defining unit defines the start point as an exit of the intersection reached by following the route along which the navigation unit navigates.

5. The navigation device of claim 1, wherein
   the intersection determining unit
   computes a time period for reaching an intersection from the current position and
   determines that the intersection being the target for route designation is present close to the current position when the time period is a given time period or less.

6. The navigation device of claim 1, wherein
   the instruction of route designation includes at least one of (i) an instruction of retrieval of a route to a destination and (ii) an instruction of route condition change.

* * * * *